United States Patent
Banerjee et al.

(10) Patent No.: US 10,309,874 B2
(45) Date of Patent: Jun. 4, 2019

(54) METHOD FOR DETERMINING PERFORMANCE OF AN INTERMITTENTLY USED REFRIGERATOR USING A PERFORMANCE MEASURING DEVICE

(71) Applicant: CARRIER CORPORATION, Jupiter, FL (US)

(72) Inventors: Joy Banerjee, Durgapur (IN); Baburaj Kaimalilputhenpura Prabha, Calicut (IN); Har Amrit Pal Singh Dhillon, Gurgaon (IN); Parminder Singh, Gurgaon (IN)

(73) Assignee: CARRIER CORPORATION, Jupiter, FL (US)

( * ) Notice: Subject to any disclaimer, the term of this patent is extended or adjusted under 35 U.S.C. 154(b) by 279 days.

(21) Appl. No.: 15/084,079

(22) Filed: Mar. 29, 2016

(65) Prior Publication Data

US 2017/0234776 A1   Aug. 17, 2017

(30) Foreign Application Priority Data

Feb. 15, 2016   (IN) .............................. 201641005245

(51) Int. Cl.
  *G21C 17/00* (2006.01)
  *G01M 99/00* (2011.01)
  *G07C 3/02* (2006.01)

(52) U.S. Cl.
  CPC ........ *G01M 99/008* (2013.01); *G01M 99/002* (2013.01); *G07C 3/02* (2013.01); *F25B 2600/0251* (2013.01)

(58) Field of Classification Search
  CPC .. C08F 210/16; C08F 2500/12; C08F 210/14; C08F 2500/03; C08F 2500/09;
  (Continued)

(56) References Cited

U.S. PATENT DOCUMENTS

| 7,644,591 B2 | 1/2010 | Singh et al. |
| 2002/0029575 A1 | 3/2002 | Okamoto |
| 2014/0229027 A1 | 8/2014 | Dhillon et al. |

OTHER PUBLICATIONS

European Search Report for application EP 1612537.1, dated May 27, 2016, 8pgs.

*Primary Examiner* — Robert G Bachner
(74) *Attorney, Agent, or Firm* — Cantor Colburn LLP

(57) ABSTRACT

The present disclosure relates to method and device for determining performance of an intermittently used refrigerator. Performance measuring device receives time stamped temperature data from temperature sensor configured in the intermittently used refrigerator. The received time stamped temperature data is used to determine values for each of one or more predefined parameters associated with the intermittently used refrigerator. The performance measuring device determines temperature variation of the intermittently used refrigerator at predefined time intervals. Based on the determined temperature variation, additional service windows in a site comprising the intermittently used refrigerator are identified i.e. the intensity of sales in the site are identified. The determined values of each of the one or more predefined parameters and the determined temperature variation, helps in determining the performance of intermittently used refrigerator. One or more suggestions related to performance of the intermittently used refrigerator and energy consumption are provided to an end user.

11 Claims, 8 Drawing Sheets

(58) Field of Classification Search
CPC .............. C08F 2500/11; C08F 2500/19; C08F 110/02; C08F 2500/17; C08F 2500/26; C08F 2500/08; C08F 4/6592; C08F 10/00; C08F 2500/05; C08F 2500/07; C08F 4/6192; C08F 10/02; C08F 110/00; C08F 2500/20; C08F 4/65908; C08F 4/65912; C08F 10/06; C08F 210/06; C08F 6/16; C08F 2500/04; C08F 2500/18; C08F 2/001; C08F 4/61908; C08F 4/61912; C08F 212/08; C08F 220/20; C08F 2220/1858; C08F 2220/325; C08F 293/00; C08F 293/005; C08F 297/00; C08F 297/02; C08F 297/026; C08L 2666/04; C08L 23/04; C08L 23/0815; C08L 2666/02; C08L 23/16; C08L 23/06; C08L 2205/02; C08L 2666/06; C08L 95/00; C08L 2314/06; C08L 23/08; C08L 53/02; C08L 99/00; C08L 27/12; C08L 2205/03; C08L 23/02; C08L 83/04; C08L 23/12; C08L 23/10; C08L 53/00; C08L 2205/025; C08L 23/0807; C08L 2666/22; C08L 23/14; C08L 2205/035; C08L 2207/02; C08L 2207/07; C08L 2308/00; C08L 2310/00; C08L 33/08; C08L 71/02; C08L 7/00; C08L 21/00; A61K 2300/00; A61K 45/06; A61K 9/0053; A61K 31/167; A61K 31/519; A61K 31/7004; A61K 31/7048; A61K 31/7076; A61K 33/06; A61K 31/352; A61K 31/366; A61K 36/185; A61K 9/0014; A61K 9/0056; A61K 38/00; A61K 38/10; A61K 38/16; A61K 38/164; A61K 38/168; A61K 38/17; A61K 38/1703; A61K 38/1709; A61K 38/1767; A61K 38/38; A61K 38/45; A61K 9/0075; A61K 9/0095; A61K 9/146; A61K 9/2054; A61K 9/2866; A61K 41/0004; A61K 2800/10; A61K 31/05; A61K 31/19; A61K 31/192; A61K 31/194; A61K 47/02; A61K 47/26; A61K 8/19; A61K 9/0019; A61K 9/08; A61K 9/143; A61K 31/195; A61K 31/282; A61K 31/337; A61K 31/35; A61K 31/4985; A61K 31/675; A61K 31/704; A61K 31/706; A61K 31/7072; A61K 2800/80; A61K 2800/805; A61K 51/1286; A61K 8/0241; A61K 8/042; A61K 8/31; A61K 8/73; A61K 8/731; A23V 2002/00

See application file for complete search history.

METHOD FOR DETERMINING PERFORMANCE OF AN INTERMITTENTLY USED REFRIGERATOR USING A PERFORMANCE MEASURING DEVICE

TECHNICAL FIELD

The present subject matter is related in general to asset management, and more particularly, but not exclusively to a method and device for determining performance of an intermittently used refrigerator.

BACKGROUND

Generally refrigerators such as under-counter chillers are used to store all sorts of food and beverage items. The food and beverage items must be stored within certain temperature ranges, otherwise the food and beverages might get spoilt. Refrigerators are a key asset and play a major role in Quick Service Restaurants. As an example, some of the typical refrigerators are Make lines, Walk in coolers, Walk in Freezers, under Counter Chillers etc. These refrigerators mainly fall in two categories, continuously used refrigerators and intermittently used refrigerators. Continuously used refrigerators are the refrigerators that operate continuously every day. Intermittently used refrigerators are the refrigerators that are operated during only certain times of the day.

Refrigerators are critical for restaurants as they have an impact on taste as well as the food safety. Refrigeration also contributes around 10-20% of the energy usage of a site that comprises the refrigerators, as these assets have high hours of usage. The non-availability or downtime of the refrigerators may cause business disruption at the site resulting in loss of sales. Also the downtime of the refrigerators may lead to throwing away food and beverages where temperature critical limits have been breached. Therefore there is a need to monitor the refrigerators regularly.

The existing techniques in use are of legacy technology which does not have the ability for Internet of Things (IoT). As a result of which collecting data related to refrigerators for on-going monitoring is not possible. However, there are some controllers available in the market which can be mounted on the refrigerators to generate the data. But the challenge is that the existing controllers which monitor the refrigerators are very expensive. Therefore, the existing controllers do not provide complete details about performance of the refrigerator for the management to adopt them for performance measurement. All these problems are applicable even for the intermittently used refrigerators where the controllers do not exist or the details about the performance of the refrigerator provided is completely un-realistic. The intermittently used refrigerators have lifespan of multiple years and are expensive. With the existing technology, to analyse complete details about the performance of the intermittently used refrigerators, the management of the restaurants may have to change the existing intermittently used refrigerators with new IoT ready refrigerators. But buying new IoT ready refrigerators is very expensive for the management personnel of restaurants. So the management personnel of the restaurants may not opt to replace the existing refrigerators with the latest IoT ready refrigerators.

Therefore, there is need for a method and a device for managing the energy as well as operational performance of intermittently used refrigerators at a feasible price.

SUMMARY

One or more shortcomings of the prior art are overcome and additional advantages are provided through the present disclosure. Additional features and advantages are realized through the techniques of the present disclosure. Other embodiments and aspects of the disclosure are described in detail herein and are considered a part of the claimed disclosure.

Disclosed herein are a method and a device for determining performance of an intermittently used refrigerator. A performance measuring device receives time stamped temperature data from temperature sensor associated with the intermittently used refrigerator. The performance measuring device determines values for each of the one or more predefined parameters and temperature variation, based on the time stamped temperature data. The present disclosure uses only the time stamped temperature data to determine the values for each of the one or more predefined parameters and the temperature variation. Temperature variation not only helps in determining performance of the intermittently used refrigerator but also helps in understanding the business intensity of a site comprising the intermittently used refrigerators. Temperature variation is directly proportional to number of times door of the intermittently used refrigerator is opened and closed. Therefore high temperature variation indicates high business intensity leading to additional service windows. So, when the temperature variation is less, it means that the business intensity is low leading to less number of additional service windows. During the time frame of such low business intensity, the method provides one or more suggestions to perform energy consumption.

Accordingly, the present disclosure comprises a method for determining performance of an intermittently used refrigerator. The method comprises receiving by a performance measuring device, time stamped temperature data corresponding to the intermittently used refrigerator. Thereafter, the performance measuring device determines values for each of one or more predefined parameters associated with the intermittently used refrigerator based on the time stamped temperature data. The one or more predefined parameters are tire up time, response time, settling temperature, food storage compliance temperature and temperature settling time. Further, the performance measuring device determines temperature variation of the intermittently used refrigerator based on the time stamped temperature data to identify additional service windows in a site comprising the intermittently used refrigerator. Finally, the performance measuring device determines the performance of the intermittently used refrigerator by analysing the temperature variation and the determined values of each of the one or more predefined parameters.

Further, the present disclosure comprises a performance measuring device for determining performance of an intermittently used refrigerator. The performance measuring device comprises a processor and a memory communicatively coupled to the processor. The memory stores the processor-executable instructions, which, on execution, causes the processor to receive time stamped temperature data corresponding to the intermittently used refrigerator. Upon receiving the time stamped temperature data, the processor determines values for each of one or more predefined parameters associated with the intermittently used refrigerator based on the time stamped temperature data. The one or more predefined parameters are fire up time, response time, settling temperature, food storage compliance temperature and temperature settling time. Further, the processor determines temperature variation of the intermittently used refrigerator based on the time stamped temperature data to identify additional service windows in a site comprising the intermittently used refrigerator. Finally, the processor determines the performance of the intermittently used refrigerator by analyzing the temperature variation and the determined values of each of the one or more predefined parameters.

Further the present disclosure relates to a non-transitory computer readable medium including instructions stored thereon that when processed by at least one processor causes a performance measuring device to perform operations comprising receiving time stamped temperature data corresponding to the intermittently used refrigerator. The instructions further cause the processor to determine values for each of one or more predefined parameters associated with the intermittently used refrigerator based on the time stamped temperature data. The one or more predefined parameters are fire up time, response time, settling temperature, food storage compliance temperature and temperature settling time. Thereafter, the instructions cause the processor to determine temperature variation of the intermittently used refrigerator based on the time stamped temperature data to identify additional service windows in a site comprising the intermittently used refrigerator. Finally, the instructions cause the processor to determine the performance of the intermittently used refrigerator by analysing the temperature variation and the determined values of each of the one or more predefined parameters.

The foregoing summary is illustrative only and is not intended to be in any way limiting. In addition to the illustrative aspects, embodiments, and features described above, further aspects, embodiments, and features will become apparent by reference to the drawings and the following detailed description.

BRIEF DESCRIPTION OF THE ACCOMPANYING DIAGRAMS

The accompanying drawings, which are incorporated in and constitute a part of this disclosure, illustrate exemplary embodiments and, together with the description, serve to explain the disclosed principles. In the figures, the left-most digit(s) of a reference number identifies the figure in which the reference number first appears. The same numbers are used throughout the figures to reference like features and components. Some embodiments of system and/or methods in accordance with embodiments of the present subject matter are now described, by way of example only, and with reference to the accompanying figures, in which:

Figure 1A:
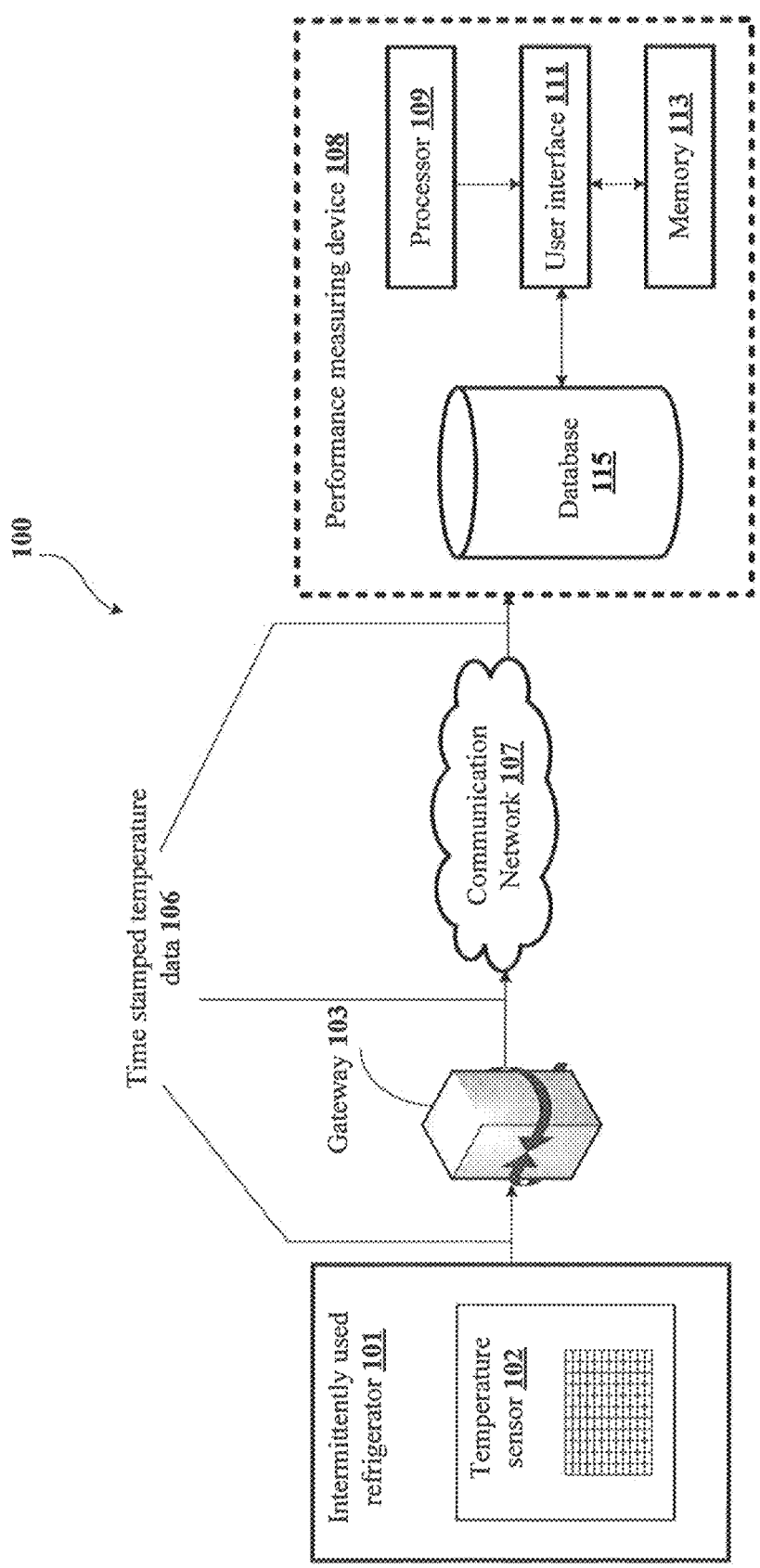
FIG. 1a shows an exemplary architecture for determining performance of an intermittently used refrigerator in accordance with some embodiments of the present disclosure.

It should be appreciated by those skilled in the art that any block diagrams herein represent conceptual views of illustrative systems embodying the principles of the present subject matter. Similarly, it will be appreciated that any flow charts, flow diagrams, state transition diagrams, pseudo code, and the like represent various processes which may be substantially represented in computer readable medium and executed by a computer or processor, whether or not such computer or processor is explicitly shown.

DETAILED DESCRIPTION

In the present document, the word "exemplary" is used herein to mean "serving as an example, instance, or illustration." Any embodiment or implementation of the present subject matter described herein as "exemplary" is not necessarily to be construed as preferred or advantageous over other embodiments.

While the disclosure is susceptible to various modifications and alternative forms, specific embodiment thereof has been shown by way of example in the drawings and will be described in detail below. It should be understood, however that it is not intended to limit the disclosure to the particular forms disclosed, but on the contrary, the disclosure is to cover all modifications, equivalents, and alternative falling within the scope of the disclosure.

The terms "comprises", "comprising", or any other variations thereof, are intended to cover a non-exclusive inclusion, such that a setup, device or method that comprises a list of components or steps does not include only those components or steps but may include other components or steps not expressly listed or inherent to such setup or device or method. In other words, one or more elements in a system or apparatus proceeded by "comprises . . . a" does not, without more constraints, preclude the existence of other elements or additional elements in the system or method.

The present disclosure relates to a method and a device for determining performance of an intermittently used refrigerator. A performance measuring device receives time stamped temperature data from temperature sensor configured in the intermittently used refrigerator. The received time stamped temperature data is used to determine the values for each of one or more predefined parameters associated with the intermittently used refrigerator. Upon determining the values for each of the one or more predefined parameters, the determined values are compared with one or more predetermined values stored in a database associated with the performance measuring device. The deviation of the determined values from the one or more predetermined values is determined based on the comparison. If any deviation is observed, the deviation is notified to an end user. Further, the performance measuring device determines temperature variation of the intermittently used refrigerator at predefined time intervals. Based on the determined temperature variation, additional service windows in a site comprising the intermittently used refrigerator are identified i.e. the intensity of sales in the site are identified. Finally, the determined values of each of the one or more predefined parameters and the determined temperature variation, helps in determining the performance of the intermittently used refrigerator. One or more suggestions related to the performance of the intermittently used refrigerator and energy consumption are provided to the end user.

In the following detailed description of the embodiments of the disclosure, reference is made to the accompanying drawings that form a part hereof, and in which are shown by way of illustration specific embodiments in which the disclosure may be practiced. These embodiments are described in sufficient detail to enable those skilled in the art to practice the disclosure, and it is to be understood that other embodiments may be utilized and that changes may be made without departing from the scope of the present disclosure. The following description is, therefore, not to be taken in a limiting sense.

FIG. 1a shows an exemplary architecture for determining performance of an intermittently used refrigerator in accordance with some embodiments of the present disclosure.

The architecture 100 comprises an intermittently used refrigerator 101, a temperature sensor 102, a gateway 103, a communication network 107 and a performance measuring device 108. As an example, the temperature sensor 102 may be air temperature sensor. The communication network 107 maybe at least one of wired communication network and wireless communication network.

Figure 1B:
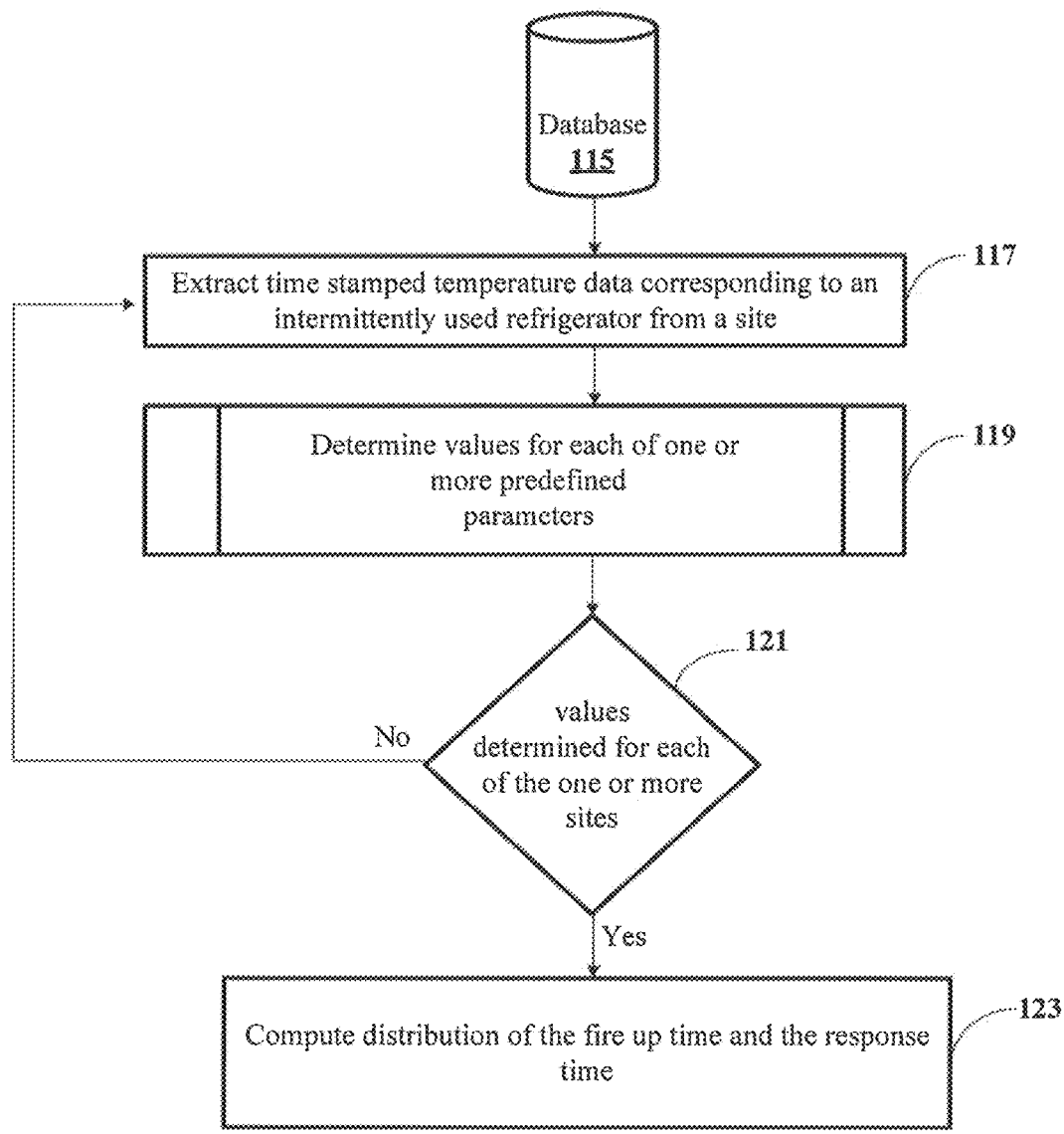
FIG. 1b-FIG. 1d illustrates flowcharts to show how the values for each of the one or more predefined parameters are determined in accordance with some embodiments of the present disclosure.

The intermittently used refrigerator 101 may be present in a site. As an example, the site may be a restaurant, a food storage area etc. The site may comprise one or more intermittently used refrigerators 101. In an embodiment, there may be one or more sites comprising one or more intermittently used refrigerators 101. For the purpose of illustration, the present disclosure is described considering that a site comprises only one intermittently used refrigerator 101. The temperature sensor 102 is configured in the intermittently used refrigerator 101. The temperature sensor 102 is configured to detect or record temperature of the intermittently used refrigerator 101 at predefined time intervals, referred to as time stamped temperature data 106, from each of the one or more sites i.e. the temperature data is collected at the given predefined time interval from each of the one or more sites. The intermittently used refrigerator 101 is connected to the gateway 103. The gateway 103 comprises a first interface and a second interface. The first interface collects time stamped temperature data 106 from the intermittently used refrigerator 101. Upon collecting the time stamped temperature data 106, the second interface transmits the time stamped temperature data 106 through the communication network 107 to the performance measuring device 108. The performance measuring device 108 comprises a processor 109, a user interface 111 and a memory 113 and a database 115. The processor 109 translates the received time stamped temperature data 106 to a readable format and stores the readable format of received time stamped temperature data 106 in the database 115. In an embodiment, the database 115 may be configured in the performance measuring device 108 or the database 115 may be standalone which is associated with the performance measuring device 108. The processor 109 determines values for each of one or more predefined parameters associated with the intermittently used refrigerator 101 based on the time stamped temperature data 106. The one or more predefined parameters are stored in the memory 113. The one or more predefined parameters may be fire up time, response time, settling temperature, food storage compliance temperature and temperature settling time. Fire up time is the time taken by the intermittently used refrigerator 101 to start the process of cooling. Initially when the intermittently used refrigerator 101 is started, internal temperature of the intermittently used refrigerator 101 is same as external temperature. Gradually, the internal temperature of the intermittently used refrigerator 101 reduces and the internal temperature reaches the desired temperature. Therefore, the time taken by the intermittently used refrigerator 101 to reach the desired temperature to start the process of cooling is known as the fire up time. Response time is the time taken by intermittently used refrigerator 101 to cool down temperature of the materials stored inside from their initial temperature to the desired temperature. As an example, the materials stored inside the intermittently used refrigerator 101 may be meat, vegetables, fruits, dishes, beverages etc. The desired temperature at which the materials inside the intermittently used refrigerator 101 may be stored is known as the food storage compliance temperature. Temperature settling time is the time taken by the intermittently used refrigerator 101 to settle at the settling temperature. The entire process of determining values for each of the one or more predefined parameters is illustrated in FIG. 1b.

At block 117, time stamped temperature data 106 is extracted from the database 115. In an embodiment, the readable format of the received time stamped temperature data 106 is stored in the database 115. The processor 109 extracts the time stamped temperature data 106 corresponding to the intermittently used refrigerator 101 present in the site from the database 115.

At block 119, the values for each of the one or more predefined parameters are determined. In an embodiment, the values for each of the one or more predefined parameters are determined based on the extracted time stamped temperature data 106.

At block 121, the processor 109 checks whether the values for each of the one or more predefined parameters are determined for all the sites. If the values are determined for all the sites, the method proceeds to block 123 via "Yes". If the values are not determined for all the sites, the method proceeds to block 117 via "No".

At block 123, the processor 109 plots a histogram. In an embodiment, the processor 109 computes distribution of the fire up time based on the values determined for the fire up time and plots the histogram for fire up time using the distribution. In an embodiment, upon computing distribution of the fire up time, the processor 109 identifies the one or more sites comprising fire up time less than $25^{th}$ quartile and greater than the $75^{th}$ quartile. Further, the processor 109 also computes distribution of the response time based on the values determined for the response time and plots the histogram for response time using the distribution. In an embodiment, upon computing distribution of the response time, the processor 109 identifies the one or more sites having response time less than $25^{th}$ quartile and greater than the $75^{th}$ quartile.

Figure 1C:
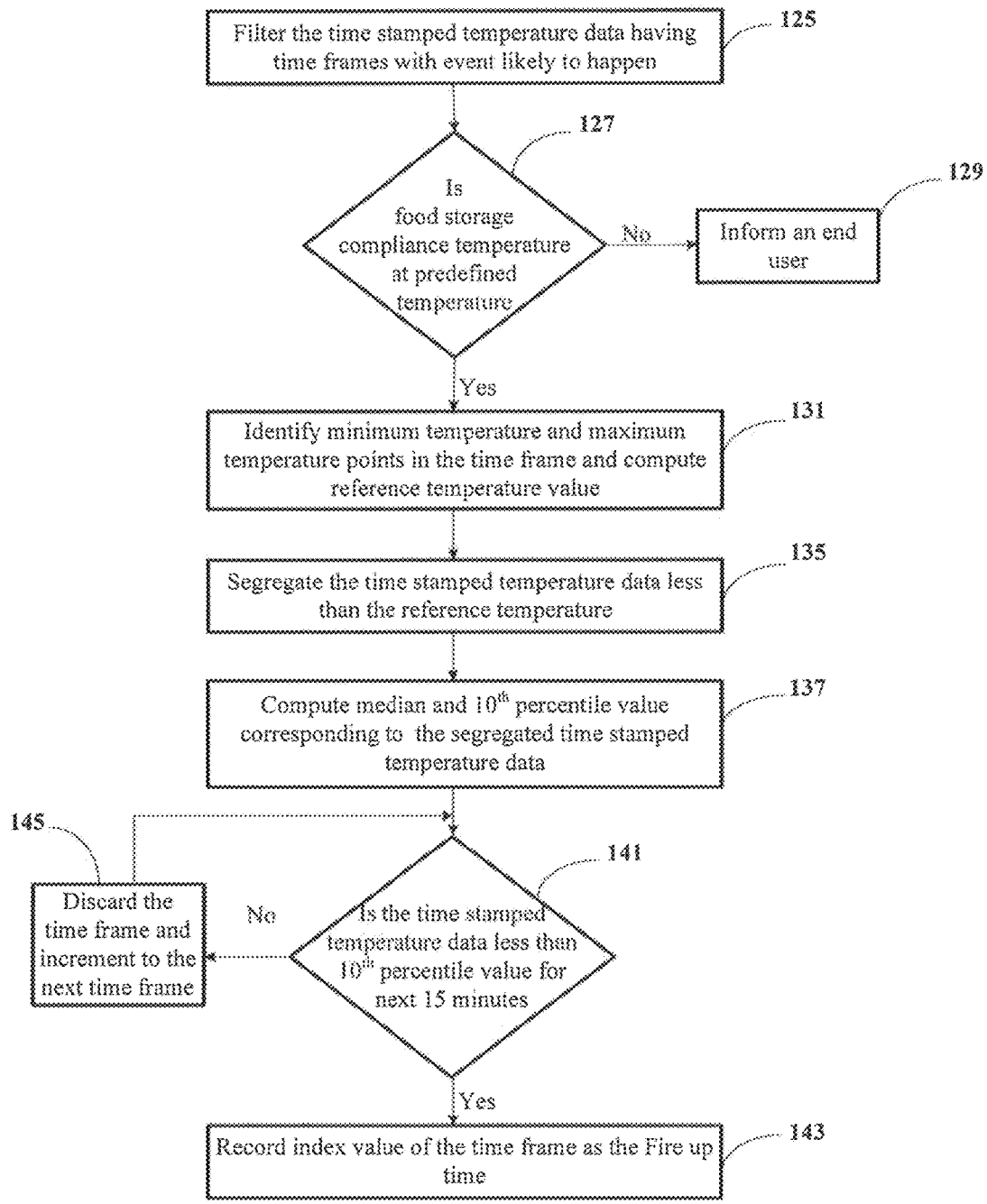

The process of determining the values for fire up time is illustrated in FIG. 1c.

At block 125, the processor 109, filters the time stamped temperature data 106. In an embodiment, the processor 109 identifies time frames of the time stamped temperature data 106 comprising events that are likely to happen in the site. As an example, the events which are likely to happen may be end of service window, setting up and starting the service window etc. In an embodiment, service window is a time frame during which service related to the business is active in the site. Finally, the processor 109 filters the time frames of the time stamped temperature data 106 comprising events that are likely to happen in the site.

At block 127, the processor 109 checks whether food storage compliance temperature is at predefined temperature. As an example, the predefined temperature may be 5° C. (Celsius). If the food storage compliance temperature is at the predefined temperature, the method proceeds to block 131 via "Yes". If the food storage compliance temperature is not at the predefined temperature, the method proceeds to block 129 via "No". In another example, the predefined temperature may be 3° C. (Celsius) or 4° C. (Celsius) or it may be varied as per the requirement.

At block 129, the processor 109 informs an end user about violation of food storage compliance temperature. As an example, the end user may be manager of the site, crew members of the site, technicians of the intermittently used refrigerator 101 etc. In an embodiment, when the food storage compliance temperature is not at the predefined temperature, the processor 109 immediately informs the end user to take necessary action. If the necessary action is not taken by the end user, materials stored in the intermittently used refrigerator 101 may get spoilt.

At block 131, the processor 109 computes value for reference temperature. In an embodiment, the processor 109 identifies minimum and maximum temperature points in the time frame. Based on the identified minimum and maximum temperature, the value for reference temperature is computed using below Equation 1.

$$\text{Reference temperature} = (\text{Minimum temperature} + \text{Maximum temperature})/2 \quad (1)$$

At block 135, the processor 109 segregates, the time stamped temperature data 106 less than the reference temperature. In an embodiment, the processor 109 segregates the time stamped temperature data 106 based on the computed value of the reference temperature. In one embodiment, the time stamped temperature data 106 less than the computed value of the reference temperature is segregated.

At block 137, the processor 109 computes the median and $10^{th}$ percentile value corresponding to the segregated time stamped temperature data 106. In an embodiment, median is denoting or relating to a value or quantity lying at the midpoint of a distribution of observed values or quantities. In other words, median is $50^{th}$ percentile value and is computed using a first predefined technique stored in the memory 113. $10^{th}$ percentile value of the segregated time stamped temperature data 106 is computed using a second predefined technique stored in the memory 113.

At block 141, the processor 109 checks if the time stamped temperature data 106 is less than $10^{th}$ percentile value for next 15 minutes or not. In an embodiment, the processor 109 checks if the time stamped temperature data 106 is less than $10^{th}$ percentile value for next 15 minutes to ensure that state of the intermittently used refrigerator 101 changes and also to avoid any noise samples. If the time stamped temperature data 106 is less than $10^{th}$ percentile value for next 15 minutes, then the method proceeds to block 143 via "Yes". If the time stamped temperature data 106 is not less than $0^{th}$ percentile value for next 15 minutes, the method proceeds to block 145 via "No".

At block 143, the processor 109 records index value of time frame as the fire up time. In an embodiment, the time stamped temperature data 106 extracted by the processor 109 comprises the time frame at which the temperature data was recorded. The index value of the time frame is considered as the fire up time.

At block 145, the processor 109 discards the time frame and increments to next time frame. In an embodiment, the processor 109 discards the time frame at which the temperature data was recorded and proceeds with the process for next time frame.

Figure 1D:
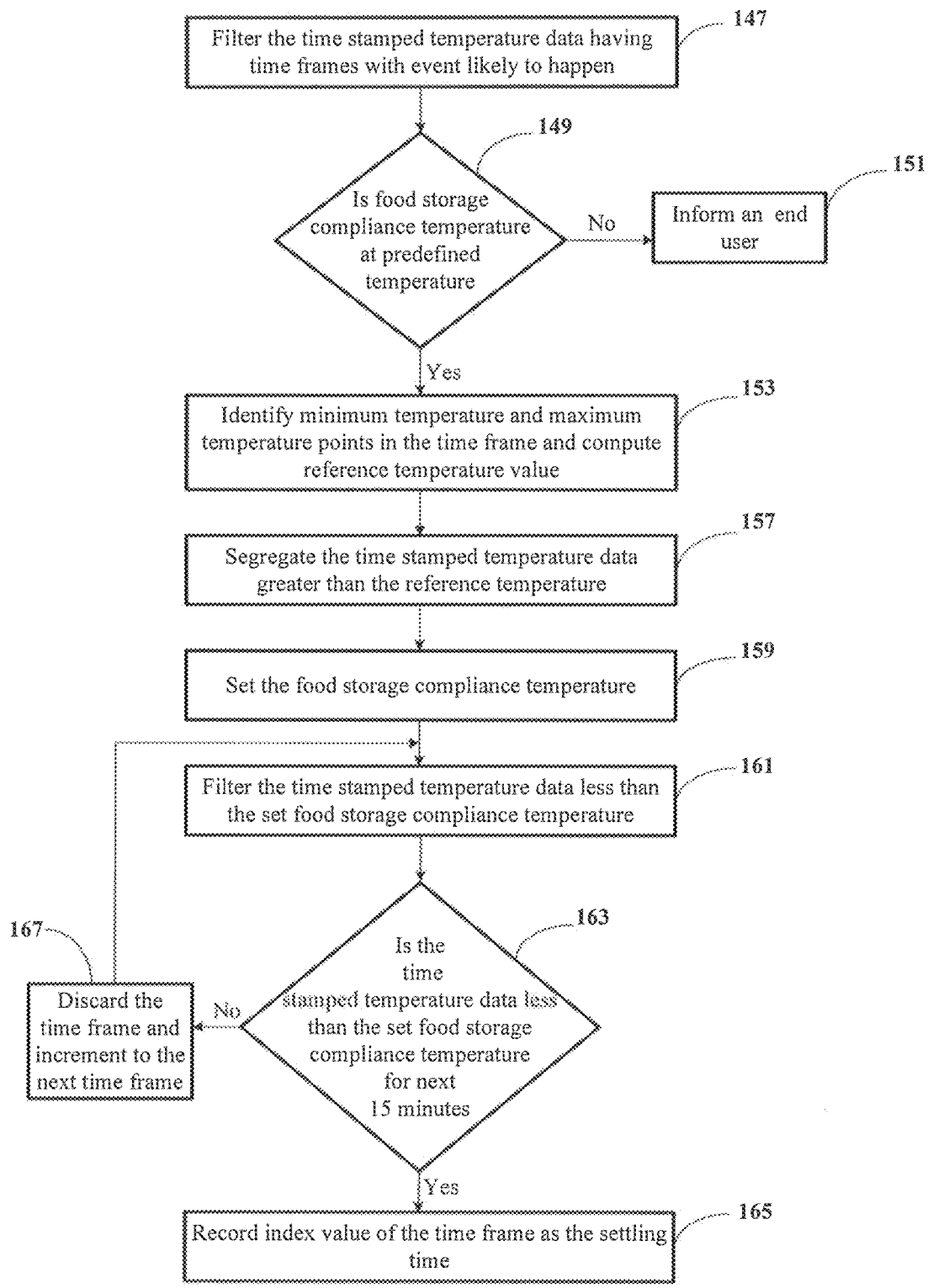

The process of determining the values for temperature settling time is illustrated in FIG. 1d.

At block 147, the processor 109, filters the time stamped temperature data 106. In an embodiment, the processor 109 identifies time frames of the time stamped temperature data 106 comprising events that are likely to happen in the site. As an example, the events which are likely to happen may be end of service window, setting up and starting the service window etc. Finally, the processor 109 filters the time frames of the time stamped temperature data 106 comprising events that are likely to happen in the site.

At block 149, the processor 109 checks whether food storage compliance temperature is at predefined temperature. As an example, the predefined temperature may be 5° C. (Celsius). If the food storage compliance temperature is at the predefined temperature, the method proceeds to block 153 via "Yes". If the food storage compliance temperature is not at the predefined temperature, the method proceeds to block 151 via "No".

At block 151, the processor 109 informs the end user. In an embodiment, when the food storage compliance temperature is not at predefined temperature, the processor 109 immediately informs the end user to take necessary action. If the necessary action is not taken by the end user, materials stored in the intermittently used refrigerator 101 may get spoilt.

At block 153, the processor 109 computes value for reference temperature. In an embodiment, the processor 109 identifies minimum and maximum temperature points in the time frame. Based on the identified minimum and maximum temperature, the value for reference temperature is computed using the Equation 1.

At block 157, the processor 109 segregates, the time stamped temperature data 106 greater than the reference temperature. In an embodiment, the processor 109 segregates the time stamped temperature data 106 based on the computed value of the reference temperature. The time stamped temperature data 106 greater than the computed value of the reference temperature is segregated.

At block 159, the processor 109 sets the food storage compliance temperature to the desired temperature. As an example, the food storage compliance temperature may be 4° C.

At block 161, the processor 109 segregates the time stamped temperature data 106 based on the set food storage compliance temperature. In an embodiment, the processor 109 segregates the time stamped temperature data 106 less than the set food storage compliance temperature.

At block 163, the processor 109 checks if the time stamped temperature data 106 is less than the set food storage compliance temperature for next 15 minutes or not. In an embodiment, the processor 109 checks if the time stamped temperature data 106 is less than the set food storage compliance temperature for next 15 minutes to ensure that state of the intermittently used refrigerator 101 changes and also to avoid any noise samples. If the time stamped temperature data 106 is less than the set food storage compliance temperature for next 15 minutes, then the method proceeds to block 165 via "Yes". If the time stamped temperature data 106 is not less than the set food storage compliance temperature for next 15 minutes, the method proceeds to block 167 via "No".

At block 165, the processor 109 records index value of time frame as the temperature settling time. In an embodiment, the time stamped temperature data 106 extracted by the processor 109 comprises the time frame at which the temperature data was recorded. The index value of the time frame is considered as the temperature settling time.

At block 167, the processor 109 discards the time frame and increments to next time frame. In an embodiment, the processor 109 discards the time frame at which the temperature data was recorded and proceeds with the process for next time frame.

In an embodiment, the processor 109 determines the value for the response time using below Equation 2.

$$\text{Response time} = \text{Temperature settling time} - \text{Fire up time} \quad (2)$$

As an example, if the temperature settling time is 5 minutes and fire up time is 3 minutes, then according to the equation 2, response time is 2 minutes.

In an embodiment, the processor 109 identifies if there is degradation in compressor efficiency of the intermittently used refrigerator 101. The compressor efficiency is determined using below equation 3.

$$\text{Compressor efficiency} = (\text{Median of the segregated time stamped temperature data} - \text{food storage compliance temperature})/\text{response time} \quad (3)$$

Upon determining the values for each of the one or more predefined parameters, the processor 109 compares the determined values of the one or more predefined parameters with one or more predetermined values associated with the performance measuring device 108. The one or more predetermined values are stored in the database 115. Upon comparing, the processor 109 determines if there is any deviation of the determined values of each of the one or more predefined parameters from the one or more predetermined values or not. If the processor 109 observes the deviation, the processor 109 immediately notifies the deviation to the end user of the intermittently used refrigerator 101 through the user interface 111.

Further, the processor 109 determines temperature variation of the temperature sensor 102 configured in the intermittently used refrigerator 101 based on the time stamped temperature data 106. The temperature variation helps in identifying additional service windows/sales in a site comprising the intermittently used refrigerator 101 i.e. determining temperature variation helps in identifying intensity of sales in the site. The temperature variation is directly proportional to opening and closing of doors of the intermittently used refrigerator 101. The opening and closing of the doors is in turn proportional to the sales in the site during the time frame comprising sales hours of the site.

Figure 1E:
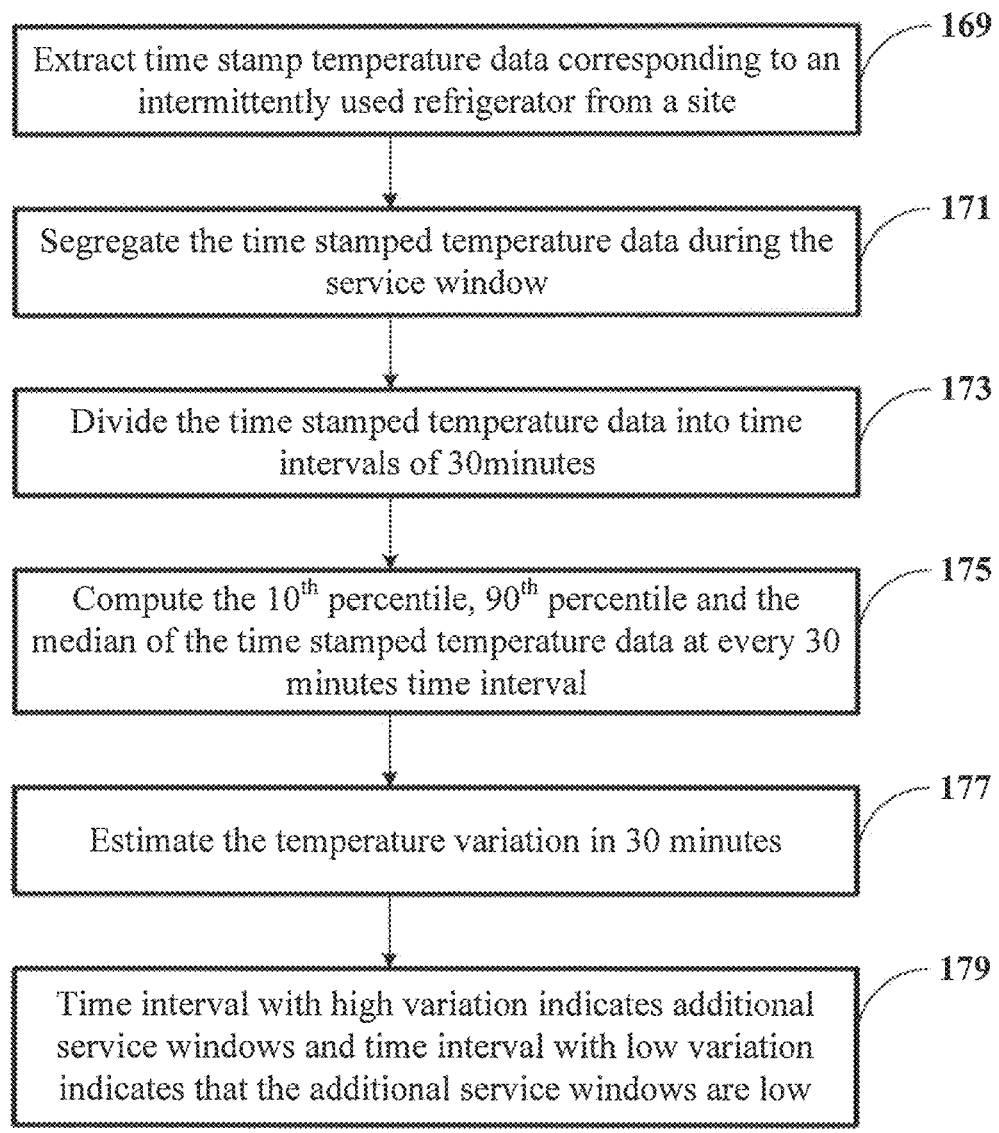
FIG. 1e illustrates flowchart to show how to determine temperature variation in accordance with some embodiments of the present disclosure.

The process of determining temperature variation of an intermittently used refrigerator 101 is illustrated in the FIG. 1e.

At block 169, the time stamped temperature data 106 is extracted from the database 115. In an embodiment, the readable format of the received time stamped temperature data 106 is stored in the database 115. The processor 109 extracts the time stamped temperature data 106 corresponding to the intermittently used refrigerator 101 present in the site from the database 115.

At block 171, the processor 109 segregates, the time stamped temperature data 106 based on the service window. In an embodiment, the processor 109 segregates the time stamped temperature data 106 during the service window of the site i.e. during the time frame comprising sales hours of the site.

At block 173, the processor 109 divides the time stamped temperature data 106. In an embodiment, the processor 109 divides the time stamped temperature data 106 into time intervals of 30 minutes.

At block 175, the processor 109 computes each of $10^{th}$ percentile value, $90^{th}$ percentile value and $50^{th}$ percentile value of the time stamped temperature data 106 for every 30 minutes. In other words, the $50^{th}$ percentile value is referred as median and is computed using the first predefined technique. In an embodiment, median is denoting or relating to a value or quantity lying at the midpoint of a distribution of observed values or quantities. The $10^{th}$ percentile value of the segregated time stamped temperature data 106 is computed using the second predefined technique. The $90^{th}$ percentile value of the segregated time stamped temperature data 106 is computed using a third predefined technique stored in the memory 113.

At block 177, the processor 109 estimates the variation in temperature in 30 minutes. In an embodiment, the temperature variation is estimated using below Equation 3.

$$\text{Temperature variation} = 90^{th} \text{ percentile value} - 10^{th} \text{ percentile value}/50^{th} \text{ percentile value} \quad (3)$$

At block 179, the processor 109 infers about the time interval with additional service windows and time interval with low service windows. In an embodiment, the processor 109 concludes that, the time interval comprising high temperature variation is the time interval with additional service windows. The time interval comprising low temperature variation is the time interval when the additional service windows are low. Identification of the time interval when the additional service windows are low helps in reducing energy consumption during the time interval. In an embodiment, the analysis of the temperature variation is in terms of, but not limited to, guest count per hour, foot falls per hour and additional service windows per hour.

Further, performance of the intermittently used refrigerator 101 is determined by the processor 109. The performance is determined by analyzing the temperature variation and the determined values of each of the one or more predefined parameters. Upon determining the performance of the intermittently used refrigerator 101, the processor 109 provides one or more suggestions to the end user through the user interface 111. The one or more suggestions are related to the performance and the energy consumption of the intermittently used refrigerator 101. The one or more suggestions aim towards reducing energy consumption, safe guarding the mechanism of the intermittently used refrigerator 101 and cost savings. As an example, the one or more suggestions may include, but not limited to, detecting early signs of performance degradation and recommendation for preventing catastrophic failures that can disrupt business because of downtime of the intermittently used refrigerator 101, recommendation on enhancement of the refrigeration effect of the intermittently used refrigerator 101, suggestion on adjusting set points of the intermittently used refrigerator 101 to reduce energy consumption when the additional service windows are low, recommendation on reducing lighting levels at the site to reduce lighting energy when the additional service windows are low, recommendation on effective manpower utilization when the additional service windows are low and recommendation on food stocking/ordering to meet demand during the time interval of the additional service windows.

Figure 2:
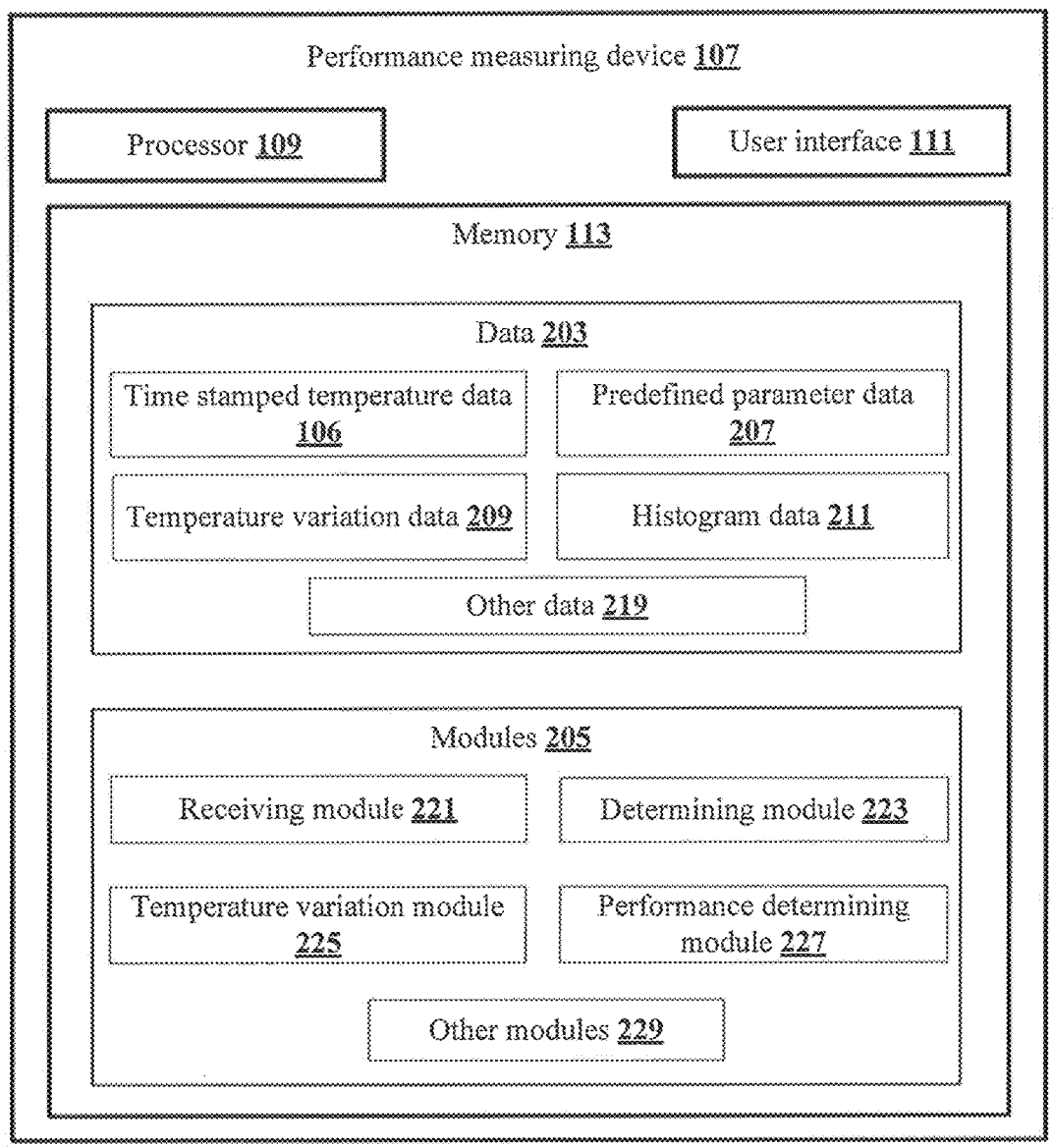
FIG. 2 shows a detailed block diagram of a performance measuring device for determining performance of an intermittently used refrigerator in accordance with some embodiments of the present disclosure.

FIG. 2 shows a detailed block diagram of a performance measuring device for determining performance of an intermittently used refrigerator in accordance with some embodiments of the present disclosure.

In one implementation, the performance measuring device 108 receives data 203 from a temperature sensor 102 configured in the intermittently used refrigerator 101. As an example, the data 203 may be stored in a memory 113 configured in the performance measuring device 108. In one embodiment, data 203 comprises time stamped temperature data 106, predefined parameter data 207, temperature variation data 209, histogram data 211 and other data 219. In the illustrated FIG. 2, modules 205 stored in the memory 113 are described herein in detail.

In one embodiment, the data 203 may be stored in the memory 113 in the form of various data structures. Additionally, the aforementioned data 203 can be organized using data models, such as relational or hierarchical data models. The other data 219 may store data, including temporary data and temporary files, generated by modules 205 for performing the various functions of the performance measuring device 108.

In an embodiment, the time stamped temperature data 106 is provided by temperature sensor 102 configured in the intermittently used refrigerator 101. The temperature sensor 102 detects or records temperature of the intermittently used refrigerator 101 at predefined time intervals, known as the time stamped temperature data 106, from each of one or more sites.

In an embodiment, the predefined parameter data 207 comprises one or more predefined parameters which are determined by the performance measuring device 108. The one or more predefined parameters may be fire up time, response time, settling temperature, food storage compliance temperature and temperature settling time. Fire up time is time taken by the intermittently used refrigerator 101 to start the process of cooling. Initially when the intermittently used refrigerator 101 is fired up, internal temperature of the intermittently used refrigerator 101 is same as external temperature. Gradually, the internal temperature of the intermittently used refrigerator 101 reduces and the internal temperature reaches the desired temperature. Therefore, the time taken by the intermittently used refrigerator 101 to reach the desired temperature to start the process of cooling is known as the fire up time. Response time is the time taken by intermittently used refrigerator 101 to cool down temperature of the materials stored inside from their initial temperature to the desired temperature. As an example, the materials stored inside the intermittently used refrigerator 101 may be meat, vegetables, fruits, dishes, beverages etc. The desired temperature at which the materials inside the intermittently used refrigerator 101 may be stored is known as the food storage compliance temperature. Temperature settling time is the time taken by the intermittently used refrigerator 101 to settle at the settling temperature.

In an embodiment, temperature variation data 209 comprises temperature variation of an intermittently used refrigerator 101 which is determined by the performance measuring device 108. Processor 109 configured in the performance measuring device 108 estimates the variation in temperature in every 30 minutes time interval. Therefore, temperature variation data 209 comprises the temperature variation estimated in a particular time frame.

In an embodiment, histogram data 211 comprises computed distribution of the fire up time based on the values determined for the fire up time and computed distribution of the response time based on the values determined for the response time. The histogram data 211 also comprises the plotted histograms of the fire up time and the response time based on the computed distributions.

In an embodiment, the data stored in the memory 113 is processed by the modules 205 of the performance measuring device 108. The modules 205 may be stored within the memory 113 as shown in the FIG. 2. In an example, the modules 205, communicatively coupled to the processor 109, may also be outside the memory 113.

In an embodiment, the modules 205 may include, for example, a receiving module 221, a determining module 223, a temperature variation module 225, a performance determining module 227 and other modules 229. The other modules 229 may be used to perform various miscellaneous functionalities of the performance measuring device 108. It will be appreciated that such aforementioned modules 205 may be represented as a single module or a combination of different modules.

In an embodiment, the receiving module 221 receives the time stamped temperature data 106 from the temperature sensor 102 through the communication network 107. The processor 109 translates the received time stamped temperature data 106 to a readable format and stores the readable format of received time stamped temperature data 106 in the database 115.

In an embodiment, the determining module 223 determines values for each of the one or more predefined parameters associated with the intermittently used refrigerator 101. The values for each of the one or more predefined parameters are determined based on the extracted time stamped temperature data 106. The values for each of the one or more predefined parameters are determined using one or more predefined techniques stored in the memory 113. Upon determining the values for each of the one or more predefined parameters, the determining module 223 determines if there is any deviation of the determined values of each of the one or more predefined parameters from one or more predetermined values. The one or more predetermined values are associated with the performance measuring device 108 and are stored in the database 115. The deviation is determined by comparing the determined values of the one or more predefined parameters with the one or more predetermined values.

In an embodiment, the temperature variation module 225 determines temperature variation of the temperature sensor 102 based on the time stamped temperature data 106. The temperature variation helps in identifying additional service windows in a site comprising the intermittently used refrigerator 101. High temperature variation indicates high business intensity leading to additional service windows. So when the temperature variation is less, it means that the business intensity is low leading to less number of additional service windows.

In an embodiment, the performance determining module 227 determines performance of the intermittently used refrigerator 101. The performance is determined by analyzing the temperature variation and the determined values of each of the one or more predefined parameters. Upon determining the performance of the intermittently used refrigerator 101, the performance determining module 227 provides one or more suggestions to the end user through the user interface 111. The one or more suggestions are related to the performance and the energy consumption of the intermittently used refrigerator 101. The one or more suggestions aim towards reducing energy consumption, safe guarding the mechanism of the intermittently used refrigerator 101 and cost savings.

Figure 3:
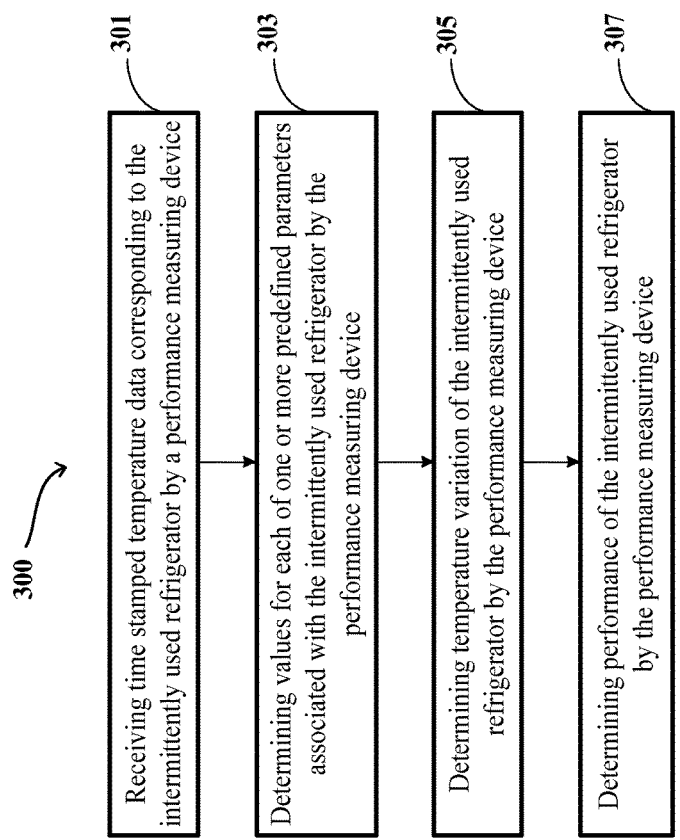
FIG. 3 illustrates a flowchart for determining performance of an intermittently used refrigerator in accordance with some embodiments of the present disclosure.

FIG. 3 illustrates a flowchart for determining performance of an intermittently used refrigerator in accordance with some embodiments of the present disclosure.

As illustrated in FIG. 3, the method 300 comprises one or more blocks illustrating a method for determining performance of an intermittently used refrigerator 101. The method 300 may be described in the general context of computer executable instructions. Generally, computer executable instructions can include routines, programs, objects, components, data structures, procedures, modules, and functions, which perform particular functions or implement particular abstract data types.

The order in which the method 300 is described is not intended to be construed as a limitation, and any number of the described method blocks can be combined in any order to implement the method. Additionally, individual blocks may be deleted from the methods without departing from the spirit and scope of the subject matter described herein. Furthermore, the method can be implemented in any suitable hardware, software, firmware, or combination thereof.

At block 301, the performance measuring device 108 receives time stamped temperature data 106. In an embodiment, the time stamped temperature data 106 detected or recorded by the temperature sensor 102 is received through the communication network 107. The processor 109 translates the received time stamped temperature data 106 to a readable format and stores the readable format of received time stamped temperature data 106 in the database 115.

At block 303, the performance measuring device 108 determines values for each of the one or more predefined parameters associated with the intermittently used refrigerator 101. The one or more predefined parameters may be fire up time, response time, settling temperature, food storage compliance temperature and temperature settling time. In an embodiment, the values for each of the one or more predefined parameters are determined based on the extracted time stamped temperature data 106. The values for each of the one or more predefined parameters are determined using one or more predefined techniques stored in the memory 113. Upon determining the values for each of the one or more predefined parameters, the determining module 223 determines if there is any deviation of the determined values of each of the one or more predefined parameters from one or more predetermined values. The one or more predetermined values are associated with the performance measuring device 108 and are stored in the database 115. The deviation is determined by comparing the determined values of the one or more predefined parameters with the one or more predetermined values.

At block 305, the performance measuring device 108 determines temperature variation of the temperature sensor 102 based on the time stamped temperature data 106. In an embodiment, the temperature variation helps in identifying additional service windows in a site comprising the intermittently used refrigerator 101. The temperature variation is estimated using Equation 3. Time interval comprising high temperature variation is determined to be the time interval with additional service windows. The time interval comprising low temperature variation is the time interval when the additional service windows are low. Identification of the time interval when the additional service windows are low helps in reducing energy consumption during the time interval.

At block 307, the performance measuring device 108 determines performance of the intermittently used refrigerator 101. In an embodiment, the performance is determined by analyzing the temperature variation and the determined values of each of the one or more predefined parameters. Upon determining the performance of the intermittently used refrigerator 101, the performance measuring device 108 provides one or more suggestions to an end user. The one or more suggestions are related to the performance and the energy consumption of the intermittently used refrigerator 101. The one or more suggestions aim towards reducing energy consumption, safe guarding the mechanism of the intermittently used refrigerator 101 and cost savings.

Figure 4:
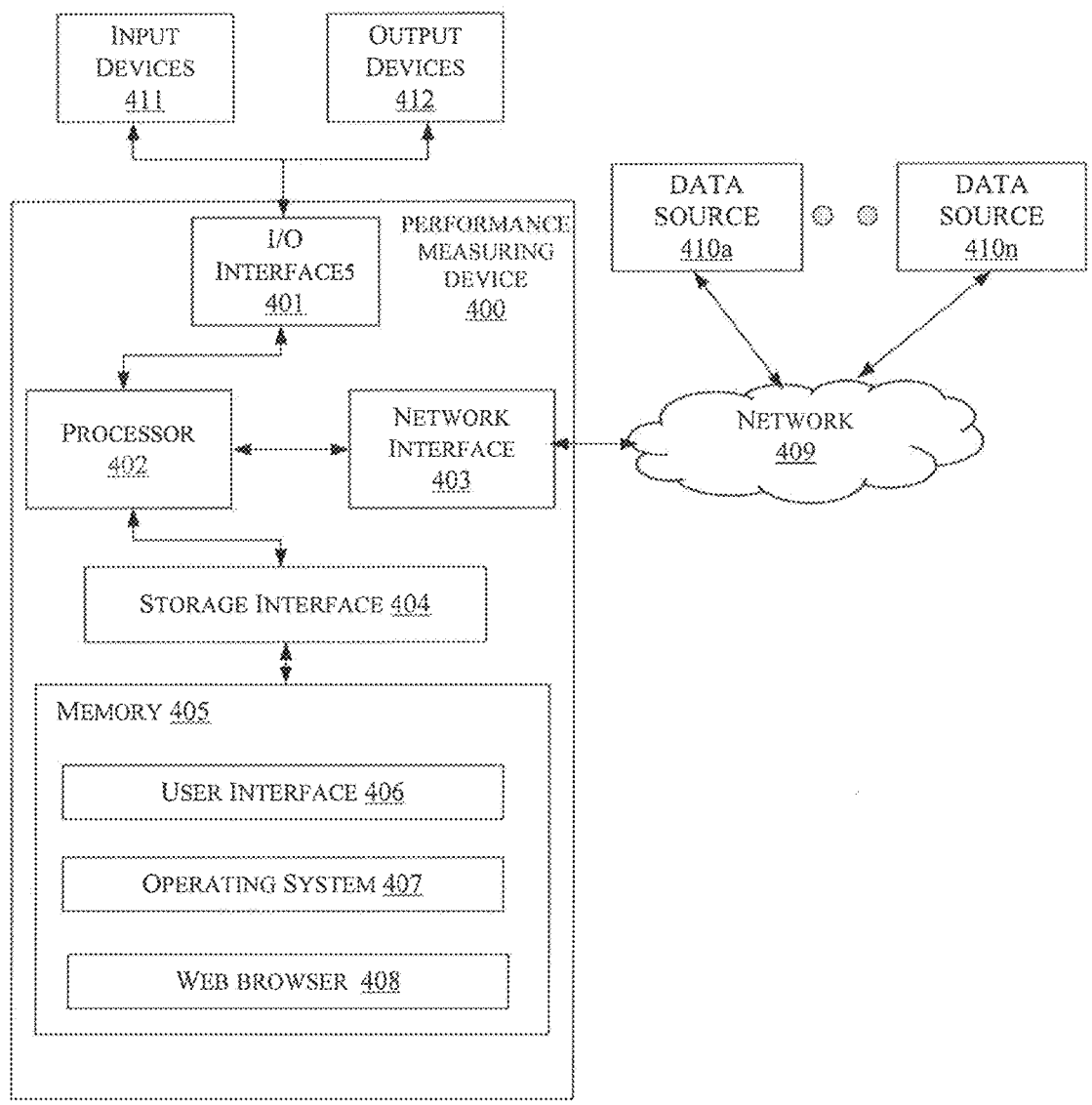
FIG. 4 is a block diagram of an exemplary computer system for implementing embodiments consistent with the present disclosure.

FIG. 4 is a block diagram of an exemplary computer system for implementing embodiments consistent with the present disclosure.

In an embodiment, the performance measuring device 400 is used for determining performance of an intermittently used refrigerator 101. The performance measuring device 400 may comprise a central processing unit ("CPU" or "processor") 402. The processor 402 may comprise at least one data processor for executing program components for executing user- or system-generated business processes. A user may include a person, a person using a device such as such as those included in this invention, or such a device itself. The processor 402 may include specialized processing units such as integrated system (bus) controllers, memory management control units, floating point units, graphics processing units, digital signal processing units, etc.

The processor 402 may be disposed in communication with one or more input/output (I/O) devices (411 and 412) via I/O interface 401. The I/O interface 401 may employ communication protocols/methods such as, without limitation, audio, analog, digital, stereo, IEEE-1394, serial bus, Universal Serial Bus (USB), infrared, PS/2, BNC, coaxial, component, composite, Digital Visual Interface (DVI), high-definition multimedia interface (HDMI), Radio Frequency (RF) antennas, S-Video, Video Graphics Array (VGA), IEEE 802.n/b/g/n/x, Bluetooth, cellular (e.g., Code-Division Multiple Access (CDMA), High-Speed Packet Access (HSPA+), Global System For Mobile Communications (GSM), Long-Term Evolution (LTE), WiMax, or the like), etc.

Using the I/O interface 401, the performance measuring device 400 may communicate with one or more I/O devices (411 and 412).

In some embodiments, the processor 402 may be disposed in communication with a communication network 409 via a network interface 403. The network interface 403 may communicate with the communication network 409. The network interface 403 may employ connection protocols including, without limitation, direct connect, Ethernet (e.g., twisted pair 10/100/1000 Base T), Transmission Control Protocol/Internet Protocol (TCP/IP), token ring, IEEE 802.11a/b/g/n/x, etc. Using the network interface 403 and the communication network 409, the performance measuring device 400 may communicate with one or more user devices 410 (a, . . . , n). The communication network 409 can be implemented as one of the different types of networks, such as intranet or Local Area Network (LAN) and such within the organization. The communication network 409 may either be a dedicated network or a shared network, which represents an association of the different types of networks that use a variety of protocols, for example, Hypertext Transfer Protocol (HTTP), Transmission Control Protocol/Internet Protocol (TCP/IP), Wireless Application Protocol (WAP), etc., to communicate with each other. Further, the communication network 409 may include a variety of network devices, including routers, bridges, servers, computing devices, storage devices, etc. The one or more user devices 410 (a, . . . , n) may include, without limitation, personal computer(s), mobile devices such as cellular telephones, smartphones, tablet computers, eBook readers, laptop computers, notebooks, gaming consoles, or the like.

In some embodiments, the processor 402 may be disposed in communication with a memory 405 (e.g., RAM, ROM, etc. not shown in FIG. 4) via a storage interface 404. The storage interface 404 may connect to memory 405 including, without limitation, memory drives, removable disc drives, etc., employing connection protocols such as Serial Advanced Technology Attachment (SATA), Integrated Drive Electronics (IDE), IEEE-1394, Universal Serial Bus (USB), fiber channel, Small Computer Systems Interface (SCSI), etc. The memory drives may further include a drum, magnetic disc drive, magneto-optical drive, optical drive, Redundant Array of Independent Discs (RAID), solid-state memory devices, solid-state drives, etc.

The memory 405 may store a collection of program or database components, including, without limitation, user interface application 406, an operating system 407, web server 408 etc. In some embodiments, performance measuring device 400 may store user/application data 406, such as the data, variables, records, etc. as described in this invention. Such databases may be implemented as fault-tolerant, relational, scalable, secure databases such as Oracle or Sybase.

The operating system 407 may facilitate resource management and operation of the performance measuring device 400. Examples of operating systems include, without limitation, Apple Macintosh OS X, UNIX, Unix-like system distributions (e.g., Berkeley Software Distribution (BSD), FreeBSD, NetBSD, OpenBSD, etc.), Linux distributions (e.g., Red Hat, Ubuntu, Kubuntu, etc.), International Business Machines (IBM) OS/2, Microsoft Windows (XP, Vista/7/8, etc.), Apple iOS, Google Android, Blackberry Operating System (OS), or the like. User interface 406 may facilitate display, execution, interaction, manipulation, or operation of program components through textual or graphical facilities. For example, user interfaces may provide computer interaction interface elements on a display system operatively connected to the performance measuring device 400, such as cursors, icons, check boxes, menus, scrollers, windows, widgets, etc. Graphical User Interfaces (GUIs) may be employed, including, without limitation, Apple Macintosh operating systems' Aqua, IBM OS/2, Microsoft Windows (e.g., Aero, Metro, etc.), Unix X-Windows, web interface libraries (e.g., ActiveX, Java, Javascript, AJAX, HTML, Adobe Flash, etc.), or the like.

In some embodiments, the performance measuring device 400 may implement a web browser 408 stored program component. The web browser may be a hypertext viewing application, such as Microsoft Internet Explorer, Google Chrome, Mozilla Firefox, Apple Safari, etc. Secure web browsing may be provided using Secure Hypertext Transport Protocol (HTTPS) secure sockets layer (SSL), Transport Layer Security (TLS), etc. Web browsers may utilize facilities such as AJAX, DHTML, Adobe Flash, JavaScript, Java, Application Programming Interfaces (APIs), etc. In some embodiments, the performance measuring device 400 may implement a mail server stored program component. The mail server may be an Internet mail server such as Microsoft Exchange, or the like. The mail server may utilize facilities such as Active Server Pages (ASP), ActiveX, American National Standards Institute (ANSI) C++/C#, Microsoft .NET, CGI scripts, Java, JavaScript, PERL, PHP, Python, WebObjects, etc. The mail server may utilize communication protocols such as Internet Message Access Protocol (IMAP), Messaging Application Programming Interface (MAPI), Microsoft Exchange, Post Office Protocol (POP), Simple Mail Transfer Protocol (SMTP), or the like. In some embodiments, the performance measuring device 400 may implement a mail client stored program component. The mail client may be a mail viewing application, such as Apple Mail, Microsoft Entourage, Microsoft Outlook, Mozilla Thunderbird, etc.

Furthermore, one or more computer-readable storage media may be utilized in implementing embodiments consistent with the present invention. A computer-readable storage medium refers to any type of physical memory on which information or data readable by a processor may be stored. Thus, a computer-readable storage medium may store instructions for execution by one or more processors, including instructions for causing the processor(s) to perform steps or stages consistent with the embodiments described herein. The term "computer-readable medium" should be understood to include tangible items and exclude carrier waves and transient signals, i.e., non-transitory. Examples include Random Access Memory (RAM), Read-Only Memory (ROM), volatile memory, non-volatile memory, hard drives, Compact Disc (CD) ROMs, Digital Video Disc (DVDs), flash drives, disks, and any other known physical storage media.

Advantages of the embodiment of the present disclosure are illustrated herein.

In an embodiment, the present disclosure provides a method and a device for determining performance of an intermittently used refrigerator.

The present disclosure determines performance of the intermittently used refrigerator by using a factor i.e. time stamped temperature data recorded by the temperature sensor associated with the intermittently used refrigerator.

The present disclosure determines values for each of the one or more predefined parameters such as fire up time, response time, food storage compliance temperature, temperature settling time and settling temperature, using statistical derivations.

The present disclosure notifies an end user immediately when there is a deviation observed in the determined values compared to one or more predetermined values.

The present disclosure provides a feature wherein temperature variation helps in understanding the business intensity of a site comprising the intermittently used refrigerators. Temperature variation is directly proportional to number of times door of the intermittently used refrigerator is opened and closed. Therefore high temperature variation indicates high business intensity leading to additional service windows. So when the temperature variation is less, it means that the business intensity is low leading to less number of additional service windows.

The present disclosure provides a feature wherein one or more suggestions are given to the end user based on the additional service windows, energy consumption and cost savings.

A description of an embodiment with several components in communication with each other does not imply that all such components are required. On the contrary a variety of optional components are described to illustrate the wide variety of possible embodiments of the invention.

When a single device or article is described herein, it will be readily apparent that more than one device/article (whether or not they cooperate) may be used in place of a single device/article. Similarly, where more than one device or article is described herein (whether or not they cooperate), it will be readily apparent that a single device/article may be used in place of the more than one device or article or a different number of devices/articles may be used instead of the shown number of devices or programs. The functionality and/or the features of a device may be alternatively embodied by one or more other devices which are not explicitly described as having such functionality/features. Thus, other embodiments of the invention need not include the device itself.

The specification has described a method and a device for determining performance of an intermittently used refrigerator. The illustrated steps are set out to explain the exemplary embodiments shown, and it should be anticipated that on-going technological development will change the manner in which particular functions are performed. These examples are presented herein for purposes of illustration, and not limitation. Further, the boundaries of the functional building blocks have been arbitrarily defined herein for the convenience of the description. Alternative boundaries can be defined so long as the specified functions and relationships thereof are appropriately performed. Alternatives (including equivalents, extensions, variations, deviations, etc., of those described herein) will be apparent to persons skilled in the relevant art(s) based on the teachings contained herein. Such alternatives fall within the scope and spirit of the disclosed embodiments. Also, the words "comprising," "having," "containing," and "including," and other similar forms are intended to be equivalent in meaning and be open ended in that an item or items following any one of these words is not meant to be an exhaustive listing of such item or items, or meant to be limited to only the listed item or items. It must also be noted that as used herein and in the appended claims, the singular forms "a," "an," and "the" include plural references unless the context clearly dictates otherwise.

Finally, the language used in the specification has been principally selected for readability and instructional purposes, and it may not have been selected to delineate or circumscribe the inventive subject matter. It is therefore intended that the scope of the invention be limited not by this detailed description, but rather by any claims that issue on an application based here on. Accordingly, the embodiments of the present invention are intended to be illustrative, but not limiting, of the scope of the invention, which is set forth in the following claims.

REFERRAL NUMERALS

| Reference Number | Description |
| --- | --- |
| 100 | Architecture |
| 101 | Intermittently used refrigerator |
| 102 | Temperature sensor |
| 103 | Gateway |
| 106 | Time stamped temperature data |
| 107 | Communication network |
| 108 | Performance measuring device |
| 109 | Processor |
| 111 | User interface |
| 113 | Memory |
| 115 | Database |
| 203 | Data |
| 205 | Modules |
| 207 | Predefined parameter data |
| 209 | Temperature variation data |
| 211 | Histogram data |
| 219 | Other data |
| 221 | Receiving module |
| 223 | Determining module |
| 225 | Temperature variation module |
| 227 | Performance determining module |
| 225 | Other modules |

What is claimed is:

1. A method for determining performance of an intermittently used refrigerator, the method comprising:
   receiving, by a performance measuring device, time stamped temperature data corresponding to the intermittently used refrigerator;
   determining, by the performance measuring device, values for each of one or more predefined parameters associated with the intermittently used refrigerator based on the time stamped temperature data, wherein the one or more predefined parameters are fire up time, response time, settling temperature, food storage compliance temperature and temperature settling time;
   determining, by the performance measuring device, temperature variation of the intermittently used refrigerator based on the time stamped temperature data to identify additional service windows in a site comprising the intermittently used refrigerator, wherein periods of temperature variation correspond to the service windows during which a door of the refrigerator is opened and closed;
   determining, by the performance measuring device, the performance of the intermittently used refrigerator by analysing the temperature variation and the determined values of each of the one or more predefined parameters;
   identifying, by the performance measuring device, a time interval when additional service windows are low in the site to reduce energy consumption of the intermittently used refrigerator during the identified time interval;
   wherein reducing energy consumption of the intermittently used refrigerator during the identified time interval comprises adjusting a set point of the intermittently used refrigerator.

2. The method as claimed in claim 1 further comprises:
   determining, by the performance measuring device, deviation of the determined values of each of the one or more predefined parameters from one or more predetermined values, wherein the one or more predetermined values are stored in a database associated with the performance measuring device; and
   notifying, by the performance measuring device, the deviation to an end user of the intermittently used refrigerator.

3. The method as claimed in claim 1 further comprises providing, by the performance measuring device, one or more suggestions related to the performance and the energy consumption of the intermittently used refrigerator to the end user.

4. The method as claimed in claim 1, wherein the time stamped temperature data is received from temperature sensor associated with the intermittently used refrigerator.

5. The method as claimed in claim 1, wherein the values for each of the one or more predefined parameters are determined using one or more predefined techniques.

6. A performance measuring device for determining performance of an intermittently used refrigerator, the performance measuring device comprising:
   a processor; and
   a memory communicatively coupled to the processor, wherein the memory stores the processor-executable instructions, which, on execution, causes the processor to:
   receive time stamped temperature data corresponding to the intermittently used refrigerator;
   determine values for each of one or more predefined parameters associated with the intermittently used refrigerator based on the time stamped temperature data, wherein the one or more predefined parameters are fire up time response time, settling temperature, food storage compliance temperature and temperature settling time;
   determine temperature variation of the intermittently used refrigerator based on the time stamped temperature data to identify additional service windows in a site comprising the intermittently used refrigerator, wherein periods of temperature variation correspond to the service windows during which a door of the refrigerator is opened and closed;

determine the performance of the intermittently used refrigerator by analyzing the temperature variation and the determined values of each of the one or more predefined parameters;

identify a time interval when additional service windows are low in the site to reduce energy consumption of the intermittently used refrigerator during the identified time interval;

wherein reducing energy consumption of the intermittently used refrigerator during the identified time interval comprises adjusting a set point of the intermittently used refrigerator.

7. The performance measuring device as claimed in claim 6 further causes the processor to:

determine deviation of the determined values of each of the one or more predefined parameters from one or more predetermined values, wherein the one or more predetermined values are stored in a database associated with the performance measuring device; and notify the deviation to an end user of the intermittently used refrigerator.

8. The performance measuring device as claimed in claim 6 further causes the processor to provide one or more suggestions related to the performance and the energy consumption of the intermittently used refrigerator to the end user.

9. The performance measuring device as claimed in claim 6 receives the time stamped temperature data from temperature sensor associated with the intermittently used refrigerator.

10. The performance measuring device as claimed in claim 6 determines the values for each of the one or more predefined parameters using one or more predefined techniques.

11. A non-transitory computer readable medium including instructions stored thereon that when processed by at least one processor causes a performance measuring device to perform operations comprising:

receiving time stamped temperature data corresponding to the intermittently used refrigerator;

determining values for each of one or more predefined parameters associated with the intermittently used refrigerator based on the time stamped temperature data, wherein the one or more predefined parameters are fire up time response time, settling temperature, food storage compliance temperature and temperature settling time;

determining temperature variation of the intermittently used refrigerator based on the time stamped temperature data to identify additional service windows in a site comprising the intermittently used refrigerator, wherein periods of temperature variation correspond to the service windows during which a door of the refrigerator is opened and closed;

determining the performance of the intermittently used refrigerator by analysing the temperature variation and the determined values of each of the one or more predefined parameters;

identifying, by the performance measuring device, a time interval when the additional service windows are low in the site to reduce energy consumption of the intermittently used refrigerator during the identified time interval;

wherein reducing energy consumption of the intermittently used refrigerator during the identified time interval comprises adjusting a set point of the intermittently used refrigerator.

* * * * *